United States Patent
Slyz et al.

(10) Patent No.: US 7,802,129 B2
(45) Date of Patent: Sep. 21, 2010

(54) MOBILE HANDSET EMPLOYING EFFICIENT BACKUP AND RECOVERY OF BLOCKS DURING UPDATE

(75) Inventors: Marko Slyz, Dana Point, CA (US); Shao-Chun Chen, Irvine, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 439 days.

(21) Appl. No.: 11/874,102

(22) Filed: Oct. 17, 2007

(65) Prior Publication Data
US 2009/0106580 A1    Apr. 23, 2009

(51) Int. Cl.
*G06F 11/00* (2006.01)
(52) U.S. Cl. .......................... 714/5; 714/6
(58) Field of Classification Search .......... 714/5, 714/7, 8, 10, 13; 711/104, 162, 170; 455/439
See application file for complete search history.

(56) References Cited

U.S. PATENT DOCUMENTS 5,684,944 A    11/1997   Lubbers
2004/0093597 A1   5/2004   Rao et al.
2004/0123282 A1*  6/2004   Rao .......................... 717/168
2005/0063242 A1   3/2005   Ren
2007/0150524 A1*  6/2007   Eker et al. ................. 707/203

FOREIGN PATENT DOCUMENTS

KR    1020010046714    6/2001

OTHER PUBLICATIONS

Burns, Randall & Long, Darrell; "In-Place Reconstruction of Delta Compressed Files"; Randal C. Burns, Dept of Computer Science, IBM Almaden Research Center, randal@almaden.ibm.com; Darrell D. E. Long, Dept of Computer Science, Univ of California, Santa Cruz, darrell@cs.ucsc.edu; 12 pgs.
Shapira, Dana & Storer, James; "In Place Differential File Compression"; The Author 2005; Published by Oxford University Press on behalf of The British Computer Society; Advance Access published on Aug. 26, 2005; 15 pgs.
PCT International Search Report dated Mar. 25, 2009.

* cited by examiner

*Primary Examiner*—Dieu-Minh Le (57) ABSTRACT

A fault tolerant method of updating software and firmware in non-volatile memory in electronic devices such as, for example, cellular phones, personal digital assistants, pagers and the like, which supports efficient recovery of corrupted memory contents when interruption of updating activities occurs, and that minimizes writes to the non-volatile memory.

20 Claims, 6 Drawing Sheets

MOBILE HANDSET EMPLOYING EFFICIENT BACKUP AND RECOVERY OF BLOCKS DURING UPDATE

The present application makes reference to U.S. Provisional Application Ser. No. 60/765,334 entitled "MOBILE HANDSET EMPLOYING EFFICIENT BACKUP AND RECOVERY OF BLOCKS DURING UPDATE", filed Feb. 4, 2006, the complete subject matter of which is hereby incorporated herein by reference, in its entirety.

In addition, the present application makes reference to U.S. Provisional Patent Application Ser. No. 60/249,606, entitled "System and Method for Updating and Distributing Information," filed Nov. 17, 2000, and International Patent Application Publication No. WO 02/41147 A1, entitled "System And Method For Updating And Distributing Information", filed Nov. 19, 2001, and having publication date Mar. 23, 2002, the complete subject matter of each of which is hereby incorporated herein by reference, in its entirety.

BACKGROUND OF THE INVENTION

Non-volatile memory is employed in a wide variety of electronic devices such as, for example, mobile handsets, cellular phones, personal digital assistants (PDA's), pagers and handheld personal computers. The non-volatile memory in these devices typically contains firmware, application software, data, and configuration information that makes the devices operational, and may be provided by the manufacturers of the electronic devices, by system operators of telecommunication carrier networks, or by third parties developers. If defects are found in such firmware/software, or if new features are to be added to such devices, the software and/or firmware in the affected electronic devices may need to be updated. Errors and/or interruptions that may occur during the updating of such operational code may leave the electronic device in a partly or completely non-functional state. To avoid this problem, present methods of updating such software and/or firmware typically involve returning the electronic device to the manufacturer, to the system operator, or to the third party, so that an update of memory contents may be performed using a direct connection to the electronic device. This is both costly and inconvenient to both the user of the electronic device, and to one performing the update.

Reliably and efficiently updating software, firmware and configuration information in mobile/wireless electronic devices is a significant challenge. An update of software or firmware in a mobile electronic device may involve modifying a large number of memory blocks of non-volatile memory (NVM). The information used to update the electronic device may be communicated via communication paths that are subject to errors and interruptions. In addition, users may interrupt update activities in an attempt to use the device, or if the device is battery operated, the battery may simply run down.

Many types of NVM (e.g., NAND or NOR FLASH memory) take a significantly larger amount of time to write, when compared to volatile memory such as typical semiconductor RAM. The number of blocks to be written during an update process influences the update time. For example, updating one block of FLASH-type NVM may involve writing to three blocks of NVM. The update time is likely to be longer for an update that involves writing three blocks of NVM, than if fewer blocks of NVM were written. In addition, the remaining life of some types of NVM is reduced by each update. Thus, achieving update time efficiency and preserving memory life depends upon the number of writes made to some types of non-volatile memory. Minimizing the number of block writes is one approach to speeding updates to software and firmware in, for example, FLASH-based electronic devices, and extending NVM lifetime. In addition, reducing the size of the update packages used to communicate updates may also have an impact on update time.

Further limitations and disadvantages of conventional and traditional approaches will become apparent to one of skill in the art, through comparison of such systems with the present invention as set forth in the remainder of the present application with reference to the drawings.

DETAILED DESCRIPTION OF THE INVENTION

Aspects of the present invention relate generally to a method and device supporting the updating of memory in electronic devices, and more specifically, to a fault tolerant method and device that efficiently updates firmware and software in memory such as, for example, non-volatile FLASH-type memory in a manner that reduces the number of writes to NVM compared to prior techniques, while also providing fault tolerance in the presence of interruptions of the memory update. While the following discussion focuses primarily on mobile electronic devices such as, for example, a mobile handset, a cellular phone, a personal digital assistant, a pager, and a handheld personal computer, this is by way of example and not by way of specific limitations of the present invention. The teaching contained herein may also be applicable to a variety of other electronic devices having a processor and memory containing software, firmware, configuration information, data files, and the like, for which updating of memory contents may be desirable.

Representative embodiments of the present invention may be employed during updates using wired or wireless communication links such as, for example, a public switched telephone network, a wired local or wide area network, an intranet, the Internet, and wireless cellular, paging, local area, personal area, and short range networks such as those referred to as WiFi, IEEE 802.11 a/b/g/n compatible networks, the short range wireless technology known as Bluetooth, and similar types of communication links.

In a representative embodiment of the present invention, information for updating memory in an electronic device such as those described above may be communicated using, for example, an update package comprising a set of instructions executable by firmware and/or software in the electronic device to transform or convert an existing version of software, firmware, and/or data in the electronic device into a new or updated version of the software, firmware, data.

Figure 1:
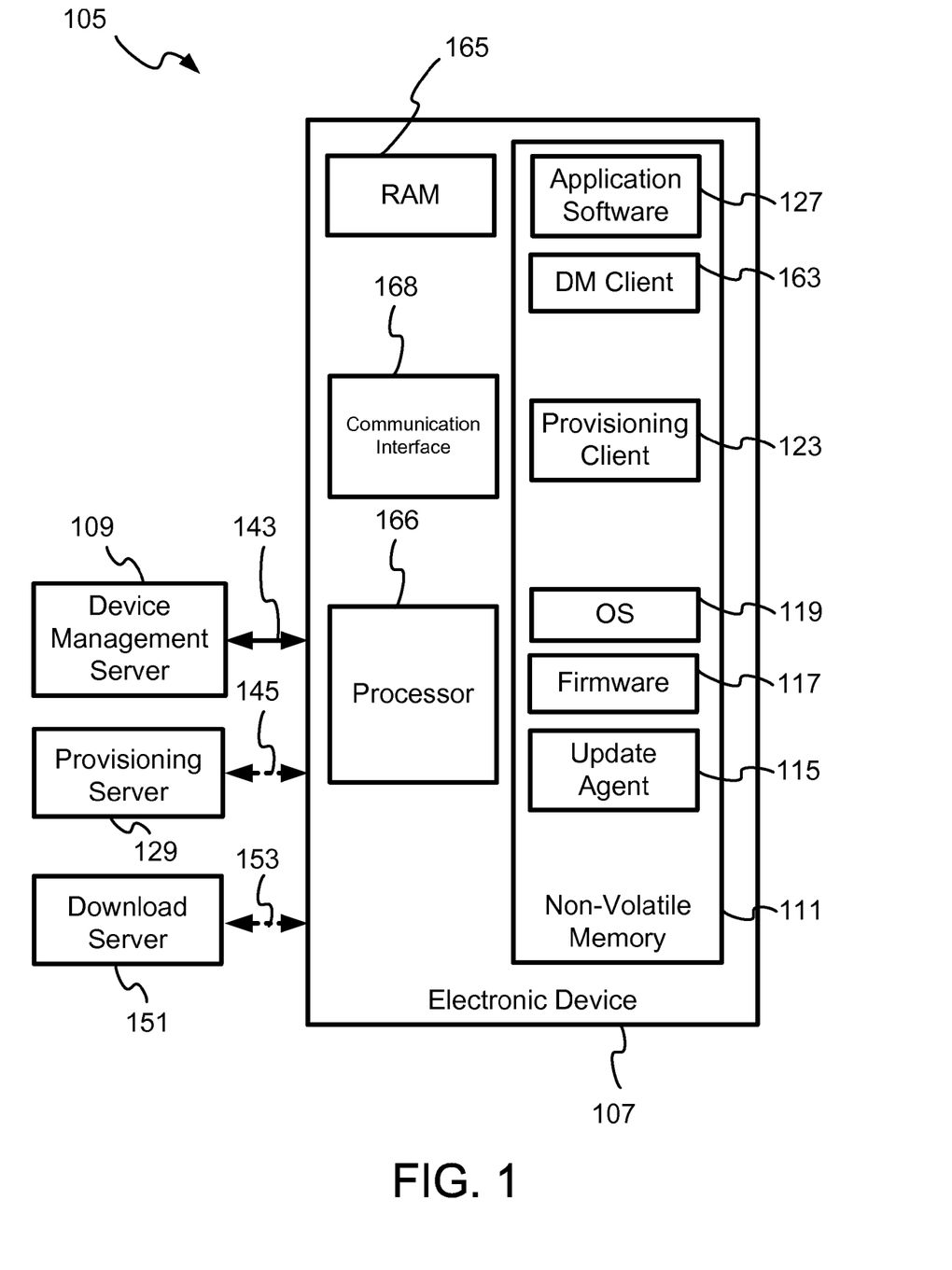
FIG. 1 is a perspective block diagram of an exemplary network that supports remote update of non-volatile memory of an electronic device such as, for example, a mobile handset or personal digital assistant, in accordance with a representative embodiment of the present invention.

FIG. 1 is a perspective block diagram of an exemplary network 105 that supports remote update of non-volatile memory of an electronic device 107 such as, for example, a mobile handset or personal digital assistant, in accordance with a representative embodiment of the present invention. The electronic device 107 may, for example, comprise a cellular phone, a personal digital assistant (PDA), a pager, a handheld personal computer (PC), and/or the like. The electronic device 107 may support a number of features and/or applications that may contain software/firmware errors that need to be corrected, or that may provide additional features/benefits by updating the software/firmware. The electronic device 107 may itself be used to request updates to software/firmware via a customer care server 157 either directly, using a browser in the electronic device 107, or via a customer service representative (CSR). A CSR may, for example, provide service to the customer using the electronic device 107 by retrieving, as necessary, one or more diagnostic management objects (MOs) stored in memory of the electronic device 107, and by transmitting to the electronic device 107 from a remote server, update information in the form of, for example, one or more update packages. Such update packages may, for example, comprise instructions to code in the electronic device 107 to convert or transform a first version of software/firmware to a second version of software/firmware, in the electronic device 107, metadata, and checksum information.

As shown in the illustration of FIG. 1, the network 105 in a representative embodiment of the present invention may comprise the electronic device 107, a device management (DM) server 109, a provisioning server 129, and a download server 151. Although not illustrated in FIG. 1, a representative embodiment of the present invention may also comprise other application servers such as, for example, a customer care server, a diagnostics server, and a self-care website/portal. The electronic device 107 of FIG. 1 is able to communicate with the DM server 109, the download server 151, and the provisioning server 129 via communication paths 143, 153 and 145, respectively. Although the communication paths 143, 153, 145 are illustrated as being separate paths between the electronic device 107 and their respective servers, this is only for purpose of illustration, and is not a specific limitation of a representative embodiment of the present invention. The communication paths 143, 153, 145 may be combined into one or more paths that may comprise wired or wireless communication paths such as, for example, a local area network, a public switched telephone network, a wireless personal, local or wide area network, and a cellular or paging network, to name only a few possibilities. Communication interface 168 shown in FIG. 1 may be employed by the processor 166, for example, in such wired and/or wireless network access.

As illustrated in FIG. 1, an electronic device in accordance with a representative embodiment of the present invention may comprise a processor 166, random access memory (RAM) 165, and non-volatile memory (NVM) 111. The NVM 111 may comprise, for example, NAND or NOR type flash memory or other suitable type of NVM. The NVM 111 may contain a number of software/firmware code components of the electronic device 107 including, for example, application software 127, a device management (DM) client 163, a provisioning client 123, an operating system (OS) 119, firmware 117, and one or more update agent(s) 115. Additional software/firmware code components may also be present in the RAM 165 and NVM 111. The term "code" may be used herein to represent one or more of executable instructions, operand data, configuration parameters, and other information stored in memory of the electronic device 107.

In a representative embodiment of the present invention, an electronic device such as for example, the electronic device 107 of FIG. 1 may employ an update package delivered by the download server 151 to update code components in memory of the electronic device 107. Such an update package may comprise update information including, for example, metadata describing an update, checksums, and instructions executable by one or more update agents such as, for example, the update agent 115 of FIG. 1. The update agent(s) may process respective portion of the executable instructions of the update package to convert/transform respective portions of a first/current version of code in memory of the electronic device 107 to portions of a second/updated version of code. The electronic device 107 may also receive provisioning information from, for example, the device management server 109, the customer care server 157, and/or the provisioning server 129 to fix configuration problems or reconfigure software and hardware.

In addition to those elements described above, the electronic device 107 may comprise a downloaded diagnostic client (not shown) that facilitates remote diagnosis, and a traps client (not shown) that facilitates the setting of traps and retrieving of collected information. The DM client 163 of the electronic device 107 may interact with the DM server 109, the diagnostic client, and the traps client, to receive DM commands from the DM server 109 and to implement them in the electronic device 107. The download server 151 may be employed to download firmware and software updates (e.g., update information in the form of, for example, update packages). The download server 151 may also be used to download new firmware/software such as, for example, the diagnostics client, which may then be installed and activated in the electronic device 107.

As described briefly above, an electronic device in accordance with a representative embodiment of the present invention (e.g., electronic device 107) may receive update information (e.g., an update package) for processing by an update agent (e.g., update agent 115) to convert/transform software (e.g., application software 127) and/or firmware (e.g., firmware 117) to produce updated software/firmware in the electronic device. Because the operation of the electronic device 107 may be interrupted by the user of the electronic device (e.g., pressing of keys, removal of the battery, depletion of the charge in the battery, etc.), the performance of updates of the software/firmware of the electronic device is also subject to being interrupted. Such interruptions may cause portions of memory being updated to be corrupted. A representative embodiment of the present invention may be employed to restore/recover corrupted NVM in the electronic device 107.

Figure 2:
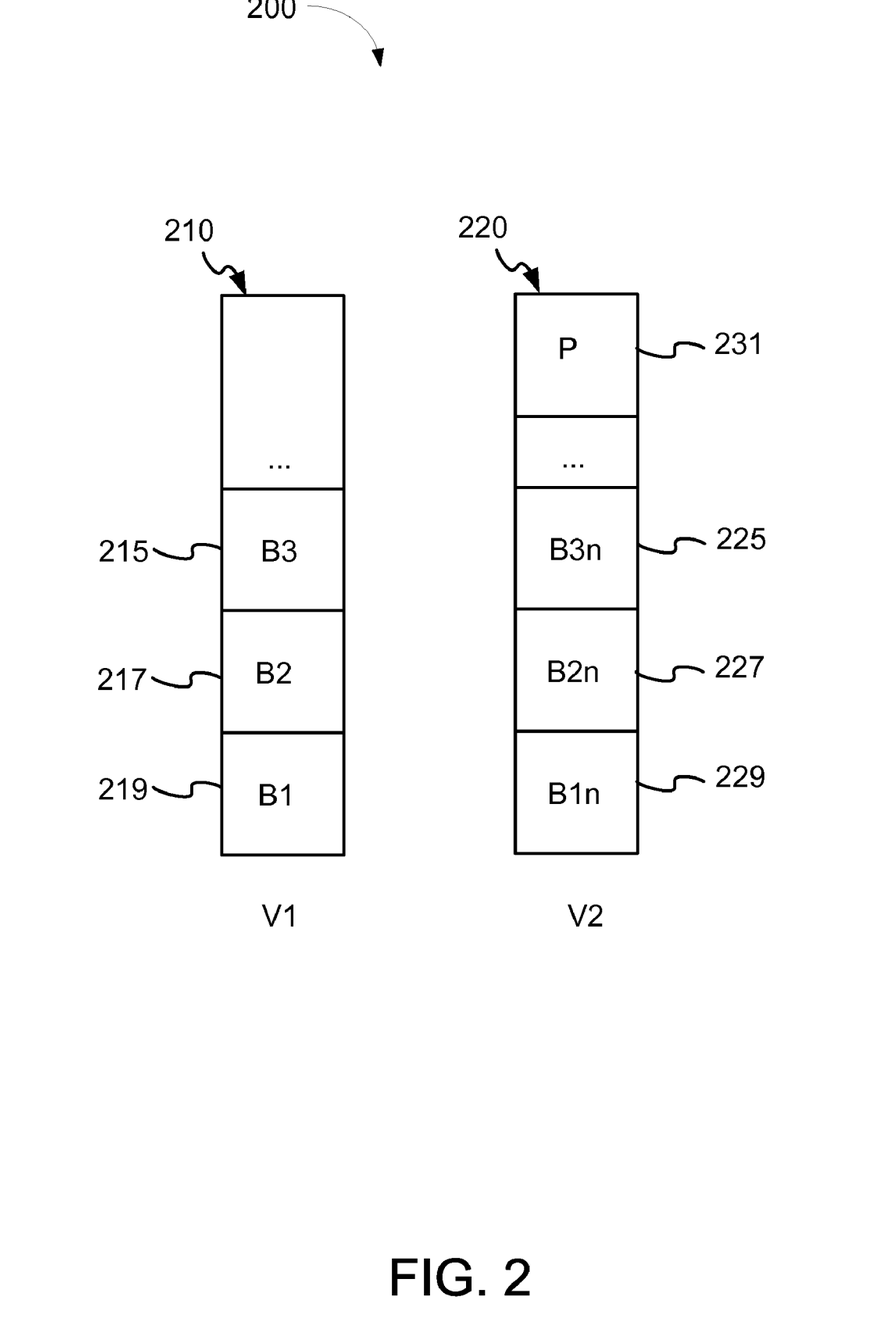
FIG. 2 is a perspective block diagram of memory showing a first/older version V1 of memory containing blocks B1, B2, and B3 of software/firmware, before updating, and a second/updated version V2 of memory containing corresponding updated blocks B1$n$, B2$n$, and B3$n$ after updating the software/firmware and storing a calculated parity block P, in accordance with a representative embodiment of the present invention.

FIG. 2 is a perspective block diagram 200 of memory showing a first/older version V1 of memory 210 containing blocks B1 219, B2 217, and B3 215 of software/firmware, before updating, and a second/updated version V2 of memory 220 containing corresponding updated blocks B1n 229, B2n 227, and B3n 225 after updating the software/firmware and storing a calculated parity block P 231, in accordance with a representative embodiment of the present invention. Blocks B1 219, B2 217 and B3 215 may, for example, reside in NVM that may comprise any of a number of different types of NVM including, for example, NAND or NOR-type FLASH memory. In a representative embodiment of the present invention, the end goal of the update process may be to have updated blocks B1n 229, B2n 227, and B3n 225 of the second/updated version V2 of memory 220 written back into the memory space occupied by the first/older version V1. Interruptions to the process of erasing and writing a memory block being updated typically corrupts the memory block. Because some types of NVM are significantly slower when writing data that when reading data, updating (i.e., writing) the contents these types of NVM may be appreciably slower than writing to RAM. The larger the amount of time needed to update a memory block, the greater the chance of corruption of the memory block, and the greater the amount of time to complete the entire update of software/firmware in the electronic device. A representative embodiment of the present invention enables the efficient recovery of corrupted blocks of non-volatile (e.g., FLASH) memory when fault tolerant (FT) updates of firmware and/or software are conducted in an electronic device, and reduces the number of writes to NVM. Because many types of NVM have a limited life as measured in terms of the maximum number of writes, software/firmware updates in accordance with a representative embodiment of the present invention have shorter update times when compared to previous approaches, and may result in longer NVM life, depending upon the type of NVM in use. The approach described herein may be employed for a variety of NVM types, including both NAND and NOR type FLASH NVM devices.

In a representative embodiment of the present invention, an update agent such as, for example, the update agent 115 of the electronic device 107 of FIG. 1 may use information in an update package to produce one or more updated blocks of the software/firmware in the electronic device. The update package used in the update activity may itself, for example, be stored in NVM (e.g., FLASH memory). During the update process, the update agent 115 may use information in the update package to convert/transform each of the existing blocks B1 219, B2 217 and B3 215 of the first/older version V1 210 of software/firmware to corresponding blocks B1n 229, B2n 227 and B3n 225 of the second/updated version V2 220. The following describes operation of one representative embodiment of the present invention during the updating of NVM in an electronic device such as, for example, the electronic device 107 of FIG. 1.

Figure 3:
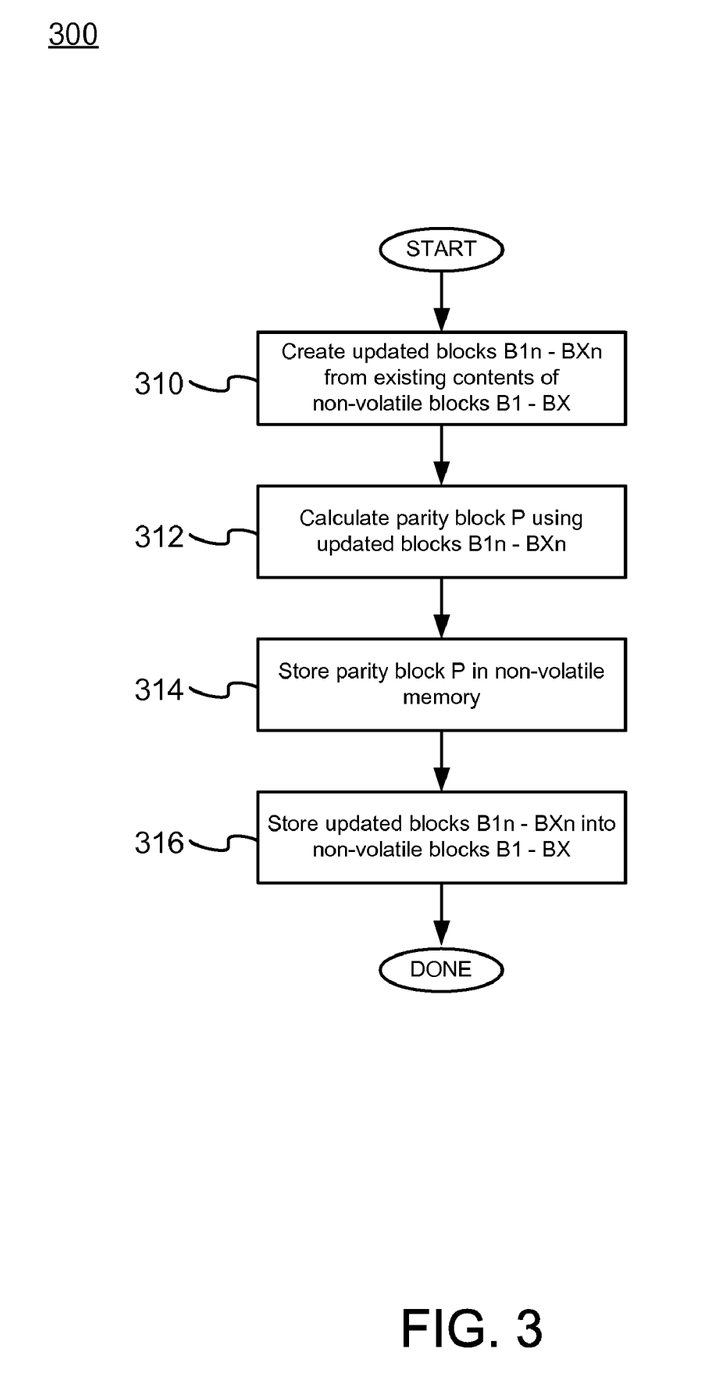
FIG. 3 shows a flowchart illustrating an exemplary method of updating NVM in an electronic device such as, for example, the NVM of electronic device of FIG. 1, in accordance with a representative embodiment of the present invention.

FIG. 3 shows a flowchart 300 illustrating an exemplary method of updating NVM in an electronic device such as, for example, the NVM 111 of electronic device 107 of FIG. 1, in accordance with a representative embodiment of the present invention. The method of FIG. 3 assumes that an existing/older version of software/firmware resides in blocks B1-BX of NVM of the electronic device (e.g., electronic device 107), and that sufficient additional read/write memory (e.g., RAM) is available in the electronic device (e.g., electronic device 107) to hold all of the updated blocks created from the existing blocks of memory B1-BX.

The method of FIG. 3 begins at step 310, when an update agent in the electronic device (e.g., update agent 115) uses the contents of an update package to create/calculate updated blocks B1n-BXn of version V2 of FIG. 2 from existing/older blocks B1-BX of version V1 of FIG. 2, according to a block or bank order. Such a block/bank order may be communicated to the update agent 115 in the received update package. From this point forward in the discussion, the symbols B1-BX and B1n-BXn represent the blocks as they appear in the block/bank order, for example, B10 refers to the tenth block in the block/bank order. In one representative embodiment of the present invention, updated block BJn may be created using blocks BJ-BX. In a representative embodiment of the present invention, the updated blocks B1n-BXn may be stored in RAM (e.g., RAM 165). Next, at step 312, a block P (e.g., P 231 of FIG. 2) is calculated using the updated blocks B1n-BXn. In one representative embodiment of the present invention, the values of bits in parity block P may be calculated as the exclusive OR (XOR) of corresponding bits in all of the updated blocks B1n-BXn, which is represented here in the following manner:

$$P = B1n \text{ XOR } B2n \text{ XOR} \ldots \text{XOR } BXn$$

Once the parity block P has been calculated, it may then be stored in NVM, as shown in step 314. In an alternate embodiment of the present invention, a generator used to produce the update package used to update the NVM memory blocks B1-BX may also produce the parity block P, and the update agent in the electronic device (e.g., electronic device 107) may receive parity block P as part of the update package.

In a representative embodiment of the present invention, the parity block P may be stored in a free block of non-volatile memory, if one is available in the electronic device 107. If, however, no unoccupied blocks of NVM are available, the generator of the update package may elect to overwrite a selected one of the existing blocks of NVM, in order to store parity block P. The selection of the block to be used may, for example, be based on the impact this may have on the size of the update package. To correct for the overwriting, the generator may place into the update package update instructions that result in the overwritten NVM block being updated to the contents it would have otherwise had, if it had simply been updated.

Next, the update blocks B1n-BXn (created at step 310) are then stored in NVM. In one representative embodiment of the present invention, each of updated blocks B1n-BXn are individually written/stored over the corresponding first/older version blocks B1-BX. If the storing of all of the updated blocks B1n-BXn is successful, the update process is complete. A record may be made that the updating was performed successfully.

In some situations, however, the process of writing/storing an updated block BJn over a first/older block BJ may be interrupted. This may be the result of a user action such as, for example, the pressing of a key or button on the electronic device, or by a loss of power to the electronic device, as when the battery is exhausted, or removed during operation. In such a situation, the block BJ may be left in a corrupted state. In a representative embodiment of the present invention, the electronic device may, at a later time, detect that an update of software/firmware was previously interrupted, and may attempt to detect a corrupted block and perform recovery.

Figure 4:
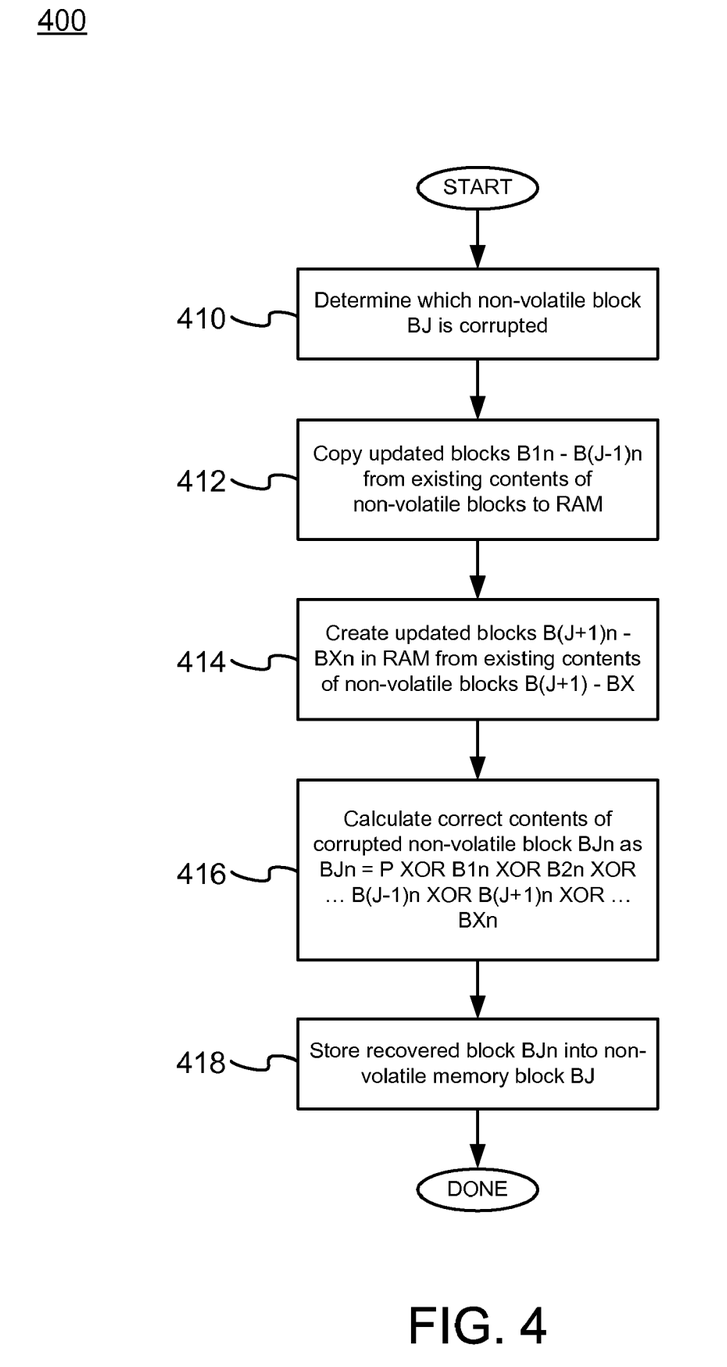
FIG. 4 shows a flowchart illustration an exemplary method of recovering a memory block BJ corrupted during an interrupted update process, in accordance with representative embodiment of the present invention.

FIG. 4 shows a flowchart 400 illustration an exemplary method of recovering a memory block BJ corrupted during an interrupted update process, in accordance with representative embodiment of the present invention. The method illustrated in FIG. 4 assumes that a previously attempted update of NVM having blocks B1-BX using the method shown in FIG. 3 was interrupted at block BJ, and that the method of FIG. 4 has been invoked to attempt recovery of corrupted block BJ. In a representative embodiment of the present invention, a method such as that shown in FIG. 4 may be invoked following a power-up or reboot of an electronic device such as, for example, the electronic device 107.

Identification of block BJ as being corrupted may be performed using, for example, cyclic redundancy check (CRC) information for each block to be updated, computed both prior to (pre-) and after (post-) updating. Such CRC information may be contained within a received update package used during the update process, as described above. At reboot or power-up, following interruption of an update attempt, the electronic device may compare the pre- and post-update block CRCs included in the update package, to a CRC calculated from the corresponding block of NVM being updated. A match of the calculated CRC for NVM block BK with the update package pre-update CRC for NVM block BK indicates that the update has not yet processed NVM block BK, and that the update process should begin/resume with NVM block BK. A match of the calculated CRC for NVM block BK with the update package post-update CRC for block BK indicates that the update activity has already successfully processed NVM block BK, and that the next NVM block in the update should be tested. A failure of the calculated CRC for NVM block BK to match both the pre- and post-update CRCs from the update package indicates that NVM block BK is corrupted and recovery of NVM block BK is in order.

The flow chart shown in FIG. 4 is based upon the assumption that the electronic device was previously engaged in an update process, which was interrupted, and that the update process updates blocks of NVM in block/bank order starting with block B1 and ending with block BX. Upon reboot or power-up, the electronic device determines that an update was in progress, and may employ the process described above to determine the last next block to be updated.

The recovery of a corrupted NVM block BJ begins at step 410, at which the electronic device determines that block BJ of the blocks B1-BX of NVM is corrupted, as described above. In a representative embodiment of the present invention, it may be assumed that the event that interrupted the update also caused the loss of the previously calculated contents of blocks B1$n$-BX$n$ in RAM. It should be noted that the updated memory blocks B1$n$-B(J−1)$n$ were stored in NVM blocks B1-B(J−1) before the interruption of the update, and are available. Therefore, at step 412, the contents of updated blocks B1$n$-B(J−1)$n$ may be copied from NVM to RAM. Next, at step 414, the update agent (e.g., update agent 115) may re-create updated blocks B(J+1)$n$ -BX$n$ from the contents of existing/old blocks B(J+1)-BX of NVM. In this manner, R/W memory (e.g., RAM) now contains the contents of updated blocks B1$n$-B(J−1)$n$ copied from NVM, and the contents of B(J+1)$n$-BX$n$ that are recreated from the existing/old contents of NVM blocks B(J+1)-BX.

Next, at step 416, the update agent calculates the contents of corrupted block BJ$n$ using the following formula:

$$BJn = B1n \text{ XOR } B2n \text{ XOR } \ldots \text{ XOR } B(J-1)n \text{ XOR } P \text{ XOR } B(J+1)n \text{ XOR } \ldots \text{ XOR } BXn,$$

where P is the contents of the parity block stored in NVM at the start of the update process shown in FIG. 3.

The contents of memory block BJ$n$ as calculated above may then be stored in NVM block BJ, at step 418, and the update of NVM may resume by storing updated blocks B(J+1)$n$-BX$n$ into NVM blocks B(J+1)-BX. Once all of the updated blocks B(J+1)$n$-BX$n$ are stored in non-volatile memory B(J+1)-BX, the update may be complete.

In the exemplary embodiment discussed above, assumptions have been made that the updated blocks B1$n$-BX$n$ are written back into their respective NVM memory blocks B1-BX, and that the update of NVM block BJ to create BJ$n$ may use any of the NVM blocks BJ-BX. As described above, a representative embodiment of the present invention allows a single corrupted block resulting from an interruption of an update process to be recovered. During the course of an entire update, more than one interruption may occur. In such a situation, for each interruption the process described above may be repeated for each corrupted block.

A representative embodiment of the present invention may select one of several techniques/approaches to the generation of the update package. In the example set forth above, sufficient read/write memory (e.g., RAM 165) is assumed to be available in the electronic device to store the updated blocks B1$n$-BX$n$, which may all be created and present in read/write memory in the electronic device at the same time. When employed in an electronic device in which only a limited amount of RAM is available (a "low RAM" situation), an alternate representative embodiment of the present invention may address the update of an amount of NVM memory that is larger that the available read/write memory by processing the blocks of NVM memory to be updated as multiple groups of less than all of the blocks. Each of the blocks of existing NVM memory in the groups are then updated to produce the updated blocks BJ$n$-BK$n$, which are each processed and written into NVM memory.

In a representative embodiment of the present invention, the generator may handle those situation where less read/write memory is available than NVM memory to be updated, by calculating a single parity block, which may be included in the update package. The update agent in the electronic device (e.g., electronic device 107) may retrieve the parity block, store it in non-volatile (e.g., FLASH) memory and use it in the fault tolerant recovery of an interrupted update process.

In some representative embodiments of the present invention, the generator may handle low RAM situations by not providing the parity block in the update package. Instead, the update agent in the electronic device (e.g., update agent 115 of electronic device 107) may calculate a single parity block, and may construct and cache in read/write memory (e.g., RAM) as many updated memory blocks (e.g., version V2) as possible.

Figure 5:
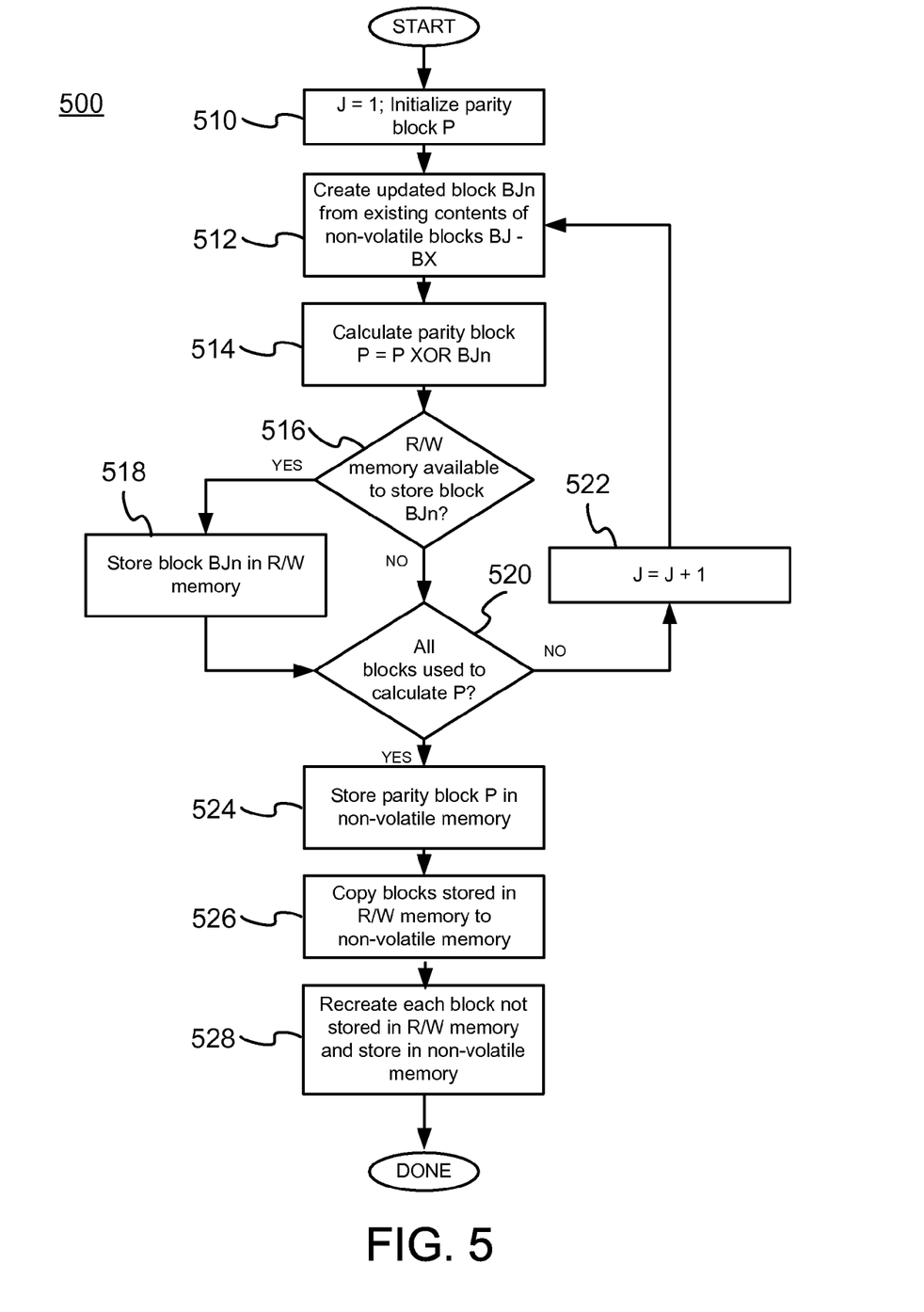
FIG. 5 shows a flowchart illustrating an exemplary method of updating non-volatile memory in an electronic device having limited read/write memory that may correspond to, for example, the electronic device of FIG. 1, in accordance with a representative embodiment of the present invention.

FIG. 5 shows a flowchart 500 illustrating an exemplary method of updating non-volatile memory in an electronic device having limited read/write memory that may correspond to, for example, the electronic device 107 of FIG. 1, in accordance with a representative embodiment of the present invention. The method of FIG. 5 assumes that an existing/older version of software/firmware resides in blocks B1-BX of NVM of the electronic device (e.g., NVM 111 of electronic device 107), and that insufficient read/write memory (e.g., RAM 165) exists in the electronic device 107 to hold all of updated blocks B1$n$-BX$n$ before writing to NVM. The method of FIG. 5 begins at step 510, which initializes a block in read/write memory, and an index J to the first NVM block to be updated. Next, at 512, existing block BJ of version V1 in NVM is processed to create an updated memory block BJ$n$ of version V2 in read/write memory (e.g., RAM 165), using information from a received updated package and existing blocks of NVM. At step 514, the updated memory block BJ$n$ is used to update the contents of parity block P (e.g., P 231 of FIG. 2), and at step 516, a check is made to determine whether read/write memory is available in which to store the updated block BJ$n$. If read/write memory is available, the update memory block BJ$n$ is stored in read/write memory, at step 518. If, however, R/W memory is not available to store the updated block BJ$n$, it is not saved. In either case, a check is then made, at step 520, to determine whether updated versions of all blocks to be updated have been used to calculate the parity block P. If not, the index J is incremented, at step 522, and the method returns (to step 512) to create the next update block BJn from NVM block BJ.

If, at step 520, it is determined that all blocks have been processed in calculating parity block P, the contents of parity block P is stored in NVM, at step 524. Then at step 526, a representative embodiment of the present invention may copy any updated blocks stored in read/write memory, to overwrite their respective blocks in NVM. The method of FIG. 5, at step 528, re-creates each updated block BJn not stored in read/write memory during calculation of parity block P, and writes each re-created updated block to its corresponding block in NVM. The method has then completed with all blocks of NVM updated. Those of skill in the art will, upon reading and assimilating the teachings of this disclosure, clearly appreciate how block recovery as described with respect to FIG. 3 may be adapted to recovery a corrupted NVM block, should the exemplary update method of FIG. 5 be interrupted.

Figure 6:
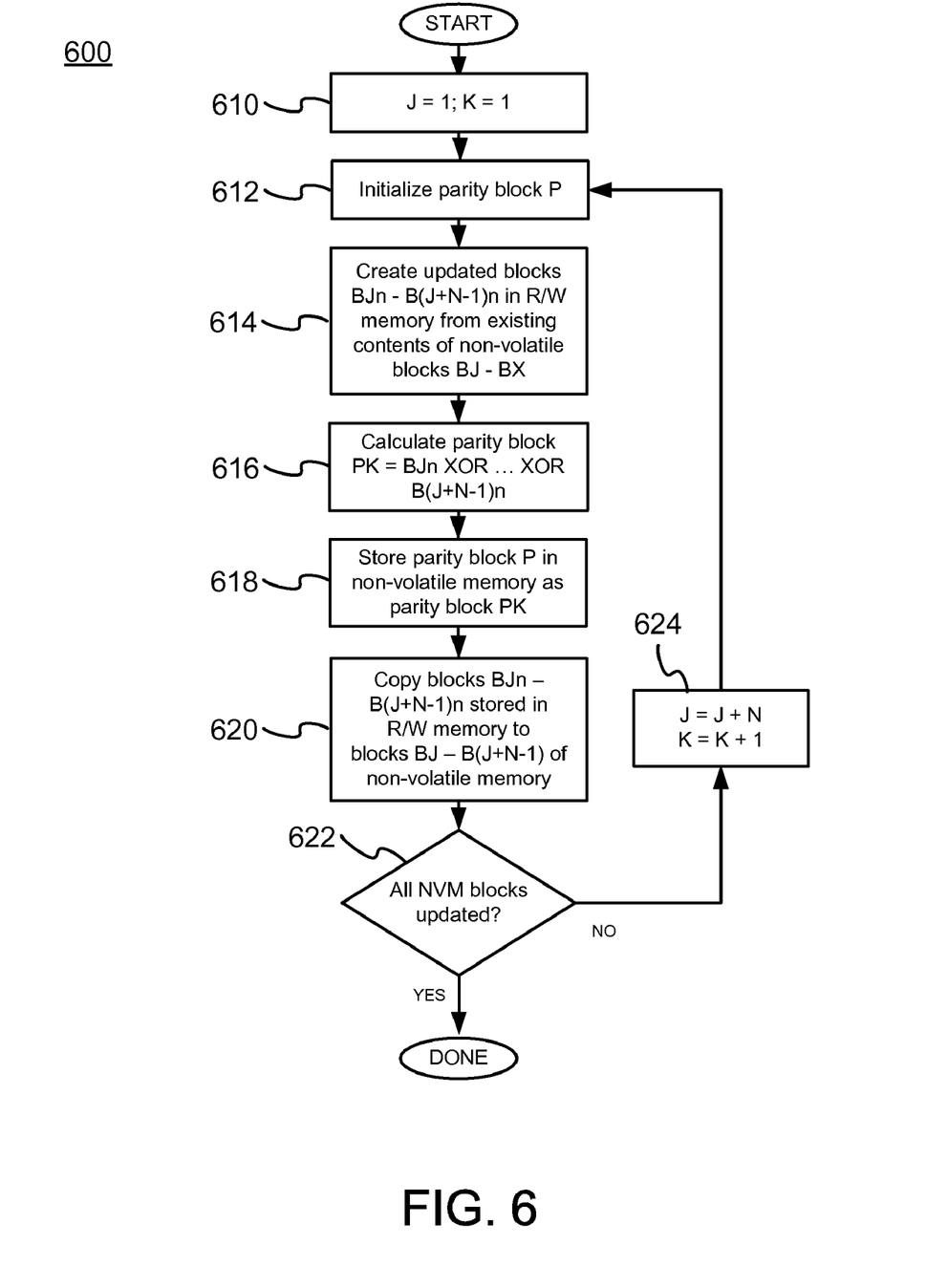
FIG. 6 shows a flowchart illustrating another exemplary method of updating non-volatile memory in an electronic device having limited read/write memory that may correspond to, for example, the electronic device of FIG. 1, in accordance with a representative embodiment of the present invention.

FIG. 6 shows a flowchart 600 illustrating another exemplary method of updating non-volatile memory in an electronic device having limited read/write memory that may correspond to, for example, the electronic device 107 of FIG. 1, in accordance with a representative embodiment of the present invention. The method of FIG. 6 assumes that an existing/older version of software/firmware resides in blocks B1-BX of NVM of the electronic device (e.g., NVM 111 of electronic device 107), and that insufficient read/write memory (e.g., RAM 165) exists in the electronic device 107 to hold all of updated blocks B1n-BXn before writing to NVM. The method of FIG. 6 begins at step 610, which initializes index J to the first block in NVM to be updated, and index K to the first parity block to be calculated. Next, at step 612, parity block P in read/write memory is initialized. Next, at step 614, blocks BJ-B(J+N-1) of NVM are processed to create updated memory blocks BJn-B(J+N-1)n of version V2 of software/firmware in read/write memory (e.g., RAM 165), using information from a received updated package and existing blocks of NVM. At step 616, the updated blocks BJn-B(J+N-1)n are used to calculate the contents of parity block P for the Kth group of N blocks, and at step 618, the contents of parity block P is stored in NVM as parity block PK. Next, at step 620, the exemplary method of FIG. 6 copies updated blocks BJn-B(J+N-1)n stored in read/write memory into NVM blocks BJ-B(J+N-1). At block 622, it is determined whether all blocks of NVM have been updated, and if not, the method increments the indices J and K to identify the next NVM block to be processed, and the next parity block to be stored, respectively (at step 624). The method then returns to step 612 and continues the update process until all NVM blocks to be updated have been processed. Those of skill in the art will, upon reading and assimilating the teachings of this disclosure, clearly appreciate how block recovery as described with respect to FIG. 3 may be adapted to recovery a corrupted NVM block, should the exemplary update method of FIG. 6 be interrupted.

A representative embodiment of the present invention as described with respect to FIG. 6 that is to update X blocks of NVM result in X+K block writes to NVM. The time used to perform the extra K writes to NVM may be expected to be less than the time used for recalculation, as in the exemplary method of FIG. 5.

A representative embodiment of the present invention may be employed, for example, in an electronic device such as electronic device 107 of FIG. 1. The electronic mobile device wherein the FLASH update occurs typically comprises a DM client that receives DM commands from a DM server and implements them. The DM server or an associated download server is used to download firmware and software updates to the FLASH memory of the mobile device for firmware and software updates. In some representative embodiments of the present invention, only one block of updated non-volatile memory may be corrupted, and the updated contents of other than the corrupted block may not be used as reference data for performing an update. An update process in accordance with a representative embodiment of the present invention may be continued by skipping the updating of the corrupted NVM block. A parity block P may be calculated using blocks from the updated version V2 of memory according to $P=(B1)v2$ XOR $(B2)v2$ XOR ... XOR $(Bn)v2$. This calculation may be performed in the generator that is employed to produce the update package used for the update, or may be calculated in the electronic device. When interruption of an update of a first version of software/firmware occurs and corrupts a block BJ, blocks B1 to B(J-1) may have been successfully updated to non-volatile blocks B1n to B(J-1)n, and updated blocks B(J+1)n to BXn may be calculated. The parity block may be used along with updated NVM blocks B1-B(J-1) and calculated updated blocks B(J+1)n -BXn, which may not be written to NVM. The updated contents, BJn, of corrupted block BJ may be then be calculated as BJn=P XOR B1 XOR B2 XOR ... XOR B(J-1) XOR B(J+1) XOR ... XOR BXn In a representative embodiment of the present invention, the speed of calculating the parity block P on the electronic device may equal the speed of performing the entire update, minus the time to perform flash write operations.

In a representative embodiment of the present invention, the generator of the update package used for the update of software/firmware in non-volatile memory may let the user choose either to pre-calculate the striping backup on the generator, or to calculate the striping backup on the electronic device (e.g., electronic device 107).

In a representative embodiment of the present invention, an update agent such as the update agent 115 of FIG. 1 may attempt to cache the calculated V2 blocks in RAM as much as possible, to save the actual update time. The time to recover a corrupted block of NVM may be variable, depending upon when during the update process (and therefore where in the block order of the update) the corruption occurs. The recovery time may be as long as the time for an update of all NVM blocks of the update, minus the time for NVM write operations, if the interruption/corruption occurs on the first NVM block, or as short as the time spent on surveying the situation, if the update process is interrupt/corrupted on updating the last block.

Although a system and method according to the present invention has been described in connection with the preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A fault tolerant method of updating non-volatile memory in a mobile electronic device comprising both non-volatile memory and volatile memory, the non-volatile memory arranged to be written as blocks, the method comprising:
   receiving an update package;
   creating, by the mobile electronic device and in the volatile memory using the update package, a plurality of updated blocks corresponding to a plurality of existing blocks of the non-volatile memory;
   calculating a parity block using all of the plurality of updated blocks;
   depositing the parity block into non-volatile memory;
   commencing storing of the plurality of updated blocks into non-volatile memory;
   detecting an interruption of the storing that generates a corrupted block in the mobile electronic device;
   identifying the corrupted block of the plurality of non-volatile memory blocks;
   calculating, by the mobile electronic device and with a formula that uses the parity block, an updated contents for the corrupted block; and
   storing the calculated updated contents for the corrupted block into the corresponding non-volatile memory block.

2. The method according to claim 1, wherein a value of each bit of the parity block is calculated as an exclusive or of the corresponding bits in of the plurality of updated blocks.

3. The method according to claim 1, wherein calculating an updated contents for the corrupted block uses the parity block, contents of non-volatile memory blocks corresponding to those of the plurality of updated blocks stored before the interruption, and volatile memory blocks created after the interruption using non-volatile memory blocks.

4. The method according to claim 1, wherein the non-volatile memory comprises semiconductor memory.

5. The method according to claim 4, wherein the non-volatile memory comprises flash-type semiconductor memory.

6. The method according to claim 1, wherein the update package comprises a set of instructions executable by software or firmware in the electronic device to create updated blocks from existing blocks of non-volatile memory.

7. The method according to claim 1, wherein identifying a corrupted block of the plurality of non-volatile memory blocks employs at least one checksum in the receive update information.

8. The method according to claim 1, wherein the mobile electronic device comprises one of a cellular phone, a personal digital assistant, a pager, or a handheld personal computer.

9. The method according to claim 1, wherein the update package is received wirelessly.

10. A mobile electronic device supporting fault tolerant updating of non-volatile memory, the device comprising:
    interface circuitry for wirelessly receiving update information;
    at least one processor operably coupled to the interface circuitry and to non-volatile and volatile memory, the non-volatile memory arranged to be written as blocks, the at least one processor operating to, at least:
       create, in the volatile memory using received update information, a plurality of updated blocks corresponding to a plurality of existing blocks of the non-volatile memory;
       calculate a parity block using the plurality of updated blocks;
       commence storing of the plurality of updated blocks into non-volatile memory;
       detect an interruption of the storing that generates a corrupted block;
       calculate, with a formula that uses the parity block, an updated contents for the corrupted block; and
       store the calculated updated contents for the corrupted block into the corresponding non-volatile memory block.

11. The device according to claim 10, wherein the at least one processor further operates to:
    deposit the parity block into non-volatile memory; and
    identify the corrupted block of the plurality of non-volatile memory blocks.

12. The device according to claim 11, wherein a value of each bit of the parity block is calculated as an exclusive or of the corresponding bits in all of the plurality of updated blocks.

13. The device according to claim 11, wherein identifying a corrupted block of the plurality of non-volatile memory blocks employs at least one checksum in the receive update information.

14. The device according to claim 10, wherein calculating an updated contents for the corrupted block uses the parity block, contents of non-volatile memory blocks corresponding to those of the plurality of updated blocks stored before the interruption, and volatile memory blocks created after the interruption using non-volatile memory blocks.

15. The device according to claim 10, wherein the non-volatile memory comprises flash-type semiconductor memory.

16. The device according to claim 10, wherein the update information comprises a set of instructions executable by software or firmware in the electronic device to create updated blocks, from existing blocks of non-volatile memory.

17. The device according to claim 10, wherein the mobile electronic device comprises one of a cellular phone, a personal digital assistant, a pager, or a handheld personal computer.

18. A server for generating update information supporting fault tolerant updating of non-volatile memory in a mobile electronic device remote from the server, the mobile electronic device comprising a plurality of blocks of non-volatile memory, the server comprising:
  at least one processor operably coupled to storage;
  calculate a parity block;
  generator code in the storage, the generator code for causing the at least one processor to produce update information for transmission to and deposit in non-volatile memory of the mobile electronic device, the update information including the parity block;
  wherein the update information and the parity block are employed by the mobile electronic device for performing fault tolerant updating of the plurality of blocks of non-volatile memory; and
  wherein the update information comprises checksum information used by the mobile electronic device to identify a point of interruption of updating of the plurality of blocks of non-volatile memory.

19. The server according to claim 18, wherein the checksum information comprises a first checksum of at least one of the plurality of blocks of non-volatile memory as expected prior to updating, and a second checksum of the at least one of the plurality of blocks of non-volatile memory expected subsequent to updating.

20. The server according to claim 18, wherein the parity block is computed with an exclusive OR from expected contents of the plurality of non-volatile memory blocks subsequent to updating.

* * * * *